(12) United States Patent
Verma et al.

(10) Patent No.: US 10,691,685 B2
(45) Date of Patent: Jun. 23, 2020

(54) CONVERTING NATURAL LANGUAGE INPUT TO STRUCTURED QUERIES

(71) Applicant: Apple Inc., Cupertino, CA (US)

(72) Inventors: Vishal Verma, Mountain View, CA (US); Gang Xiang, Santa Clara, CA (US); Vishnu Konda, Campbell, CA (US); Chetan V. Kale, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 329 days.

(21) Appl. No.: 15/721,705

(22) Filed: Sep. 29, 2017

(65) Prior Publication Data
US 2018/0349377 A1    Dec. 6, 2018

Related U.S. Application Data

(60) Provisional application No. 62/514,832, filed on Jun. 3, 2017.

(51) Int. Cl.
*G06F 16/2452*    (2019.01)
*G06N 5/02*    (2006.01)
(Continued)

(52) U.S. Cl.
CPC ...... *G06F 16/24522* (2019.01); *G06F 16/248* (2019.01); *G06F 16/2468* (2019.01); *G06F 16/3329* (2019.01); *G06F 16/3334* (2019.01); *G06F 16/3344* (2019.01); *G06F 40/211* (2020.01); *G06F 40/295* (2020.01); *G06F 40/30* (2020.01); *G06F 40/44* (2020.01); *G06N 3/0427* (2013.01); *G06N 3/0436* (2013.01); *G06N 3/0445* (2013.01); *G06N 3/0454* (2013.01); *G06N 5/022* (2013.01)

(58) Field of Classification Search
CPC ............... G06F 16/243; G06F 16/9535; G06F 16/24522; G06Q 50/01
See application file for complete search history.

(56) References Cited

U.S. PATENT DOCUMENTS

2013/0226846 A1    8/2013    Li et al.
2014/0095145 A1*   4/2014    Assulin ................. G06F 16/243
                                                                704/9
(Continued)

*Primary Examiner* — Etienne P Leroux
(74) *Attorney, Agent, or Firm* — Morgan, Lewis & Bockius LLP (57) ABSTRACT

The subject technology provides for converting natural language input to structured queries. The subject technology receives a user input query in a natural language format. The subject technology determines scores for candidate entities derived from the user input query. The subject technology selects an entity with a highest score among the candidate entities, and converts, using a context-free grammar, the user input query to a structured query based at least in part on the selected entity. The subject technology classifies the structured query to an expected answer type, the expected answer type corresponding to a type of an expected answer of the structured query. The subject technology queries a database based on the expected answer type and the structured query, the database including information corresponding to a knowledge graph. The subject technology provides, for display, an answer to the user input query based on a result of querying the database.

22 Claims, 8 Drawing Sheets

(51) Int. Cl.
  *G06F 16/248* (2019.01)
  *G06F 16/2458* (2019.01)
  *G06F 16/332* (2019.01)
  *G06F 16/33* (2019.01)
  *G06N 3/04* (2006.01)
  *G06F 40/30* (2020.01)
  *G06F 40/44* (2020.01)
  *G06F 40/211* (2020.01)
  *G06F 40/295* (2020.01)

(56) References Cited

U.S. PATENT DOCUMENTS

| | | |
|---|---|---|
| 2014/0337371 A1 | 11/2014 | Li |
| 2016/0063126 A1* | 3/2016 | Nelken ............... G06F 16/9535 707/726 |
| 2016/0140123 A1 | 5/2016 | Chang et al. |
| 2016/0260433 A1 | 9/2016 | Sumner et al. |
| 2017/0262514 A1* | 9/2017 | Campbell ............. G06Q 50/01 |

\* cited by examiner

*FIG. 8* ns and can be practiced using one or more other implementations. In one or more implementations, structures and components are shown in block diagram form in order to avoid obscuring the concepts of the subject technology.

CONVERTING NATURAL LANGUAGE INPUT TO STRUCTURED QUERIES

CROSS-REFERENCE TO RELATED APPLICATIONS

The present application claims the benefit of U.S. Provisional Patent Application Ser. No. 62/514,832, entitled "CONVERTING NATURAL LANGUAGE INPUT TO STRUCTURED QUERIES," filed Jun. 3, 2017, which is hereby incorporated herein by reference in its entirety and made part of the present U.S. Utility Patent Application for all purposes.

TECHNICAL FIELD

The present description relates generally to processing natural language input, including converting natural language input to structured queries.

BACKGROUND

For interacting with computing technology, such as computers, digital personal assistants, and the like, enabling a user to provide input in a natural language format may improve the user's experience with such technology.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject system for converting natural language input to structured queries converts a natural language input query, e.g. received from a user, to a format consistent with a structured query language syntax that can be used by a computing device to search, for example, a database. The system may retrieve results from the database and provide one or more of the results to the user in the form of an answer to the natural language input query. In this manner, the system effectively allows a user to engage in a conversation with a computing device, such as a digital personal assistant, in the same manner that the user would converse with another person.

Techniques described herein improve processing of an input query in a natural language format (e.g., natural language input) by utilizing, at least in part, machine learning models in conjunction with context-free grammars to generate a structured query for providing an answer to the input query. In comparison, when applied to natural language input, a given context-free grammar, alone, may only provide parts of speech (e.g., noun, verb), and phrases (e.g., noun phrases, verb phrases), which can be unsuitable for querying a database. Systems that process natural language input may also have difficulty in resolving ambiguity in a given natural language input (e.g., where the natural language input can have different meanings and/or intent). In one example, the subject technology can improve the efficiency of processing natural language input and resolving ambiguity in such input by advantageously utilizing large data sets (e.g., signals and/or statistical information from a database) and/or machine learning techniques to determine contextual and semantic information associated with the natural language input. Further, techniques described further herein can filter or process generated structured queries using at least domain knowledge to improve processing times for providing answers to the structured queries.

Figure 1:
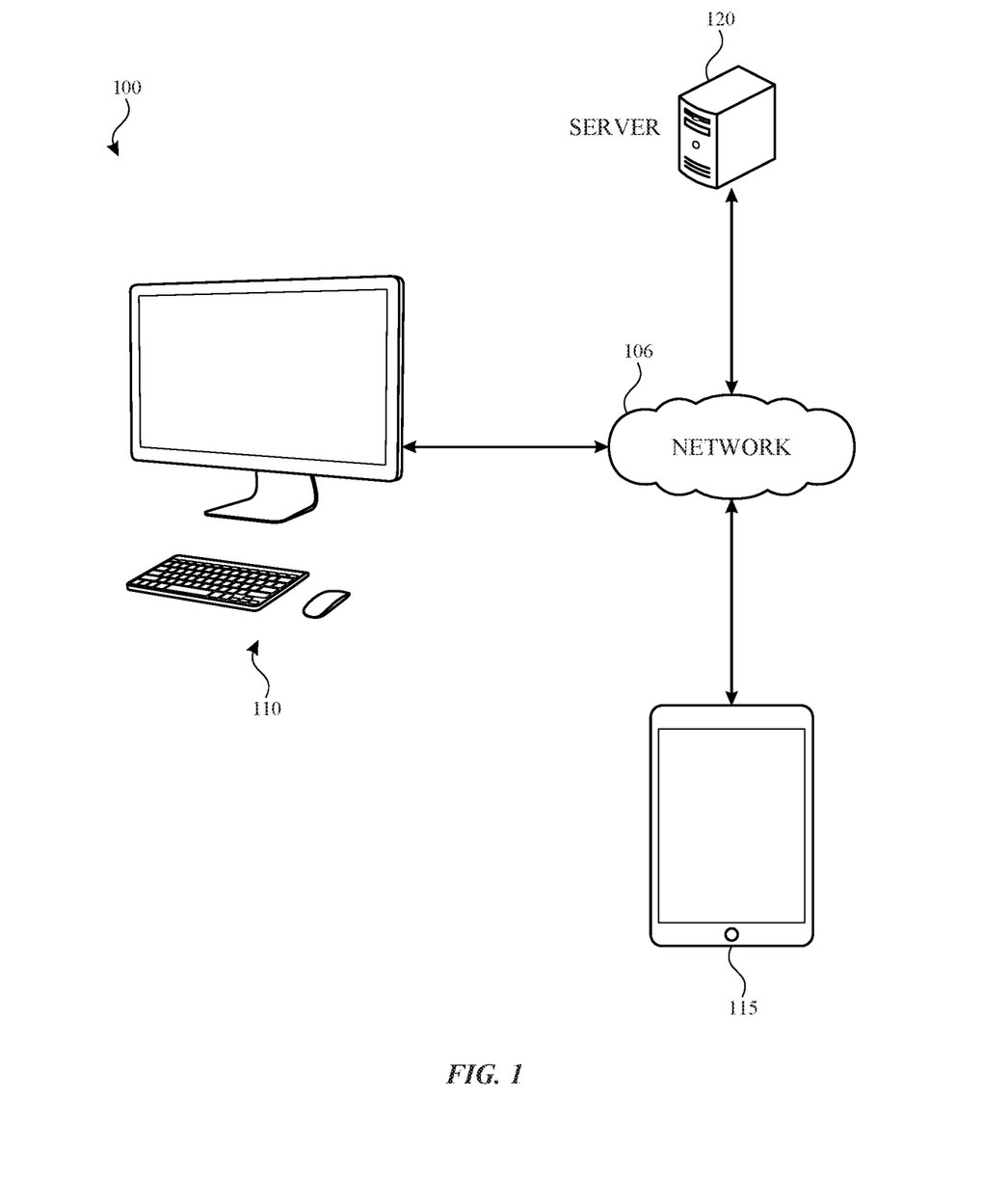
FIG. 1 illustrates an example network environment in which a system for converting natural language input to structured queries may be implemented in accordance with one or more implementations.

FIG. 1 illustrates an example network environment 100 in which a system for converting natural language input to structured queries may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 115, and a server 120. The network 106 may communicatively (directly or indirectly) couple the electronic device 110 and/or the server 120. In one or more implementations, the network 106 may be an interconnected network of devices that may include, or may be communicatively coupled to, the Internet. For explanatory purposes, the network environment 100 is illustrated in FIG. 1 as including electronic devices 110 and 115, and a server 120; however, the network environment 100 may include any number of electronic devices and any number of servers, such as a cloud of servers.

One or more of the electronic devices 110 and 115 may be, for example, a desktop computer, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In one or more implementations, one or more of the electronic devices 110 and 115 may include a touchscreen and/or may support touchscreen-like gestures, such as in a virtual reality or augmented reality environment. In FIG. 1, by way of example, the electronic device 110 is depicted as a desktop computer and the electronic device 115 is depicted as a mobile device with a touchscreen. In one or more implementations, one or more of the electronic devices 110 and 115 may be, and/or may include all or part of, the electronic system discussed below with respect to FIG. 8.

In the subject system, one or more of the electronic devices 110, 115 may receive natural language input queries, such as from one or more users, and may provide answers in response to the natural language input queries. For example, one or more of the electronic devices 110, 115 may implement a software architecture, such as in conjunction with the server 120, to provide the subject system, as is discussed further below with respect to FIG. 2. The electronic devices 110 and 115 may provide natural language input queries to the server 120, such as over the network 106, and the server 120 may process the natural language input queries, such as by converting the natural language input queries to structured queries, and may respond with an answer, such as one or more database results. The electronic devices 110, 115 may receive the answer and may process the answer and/or output the answer to a user. An example process for providing answers to natural language input queries is discussed further below with respect to FIG. 3.

Figure 2:
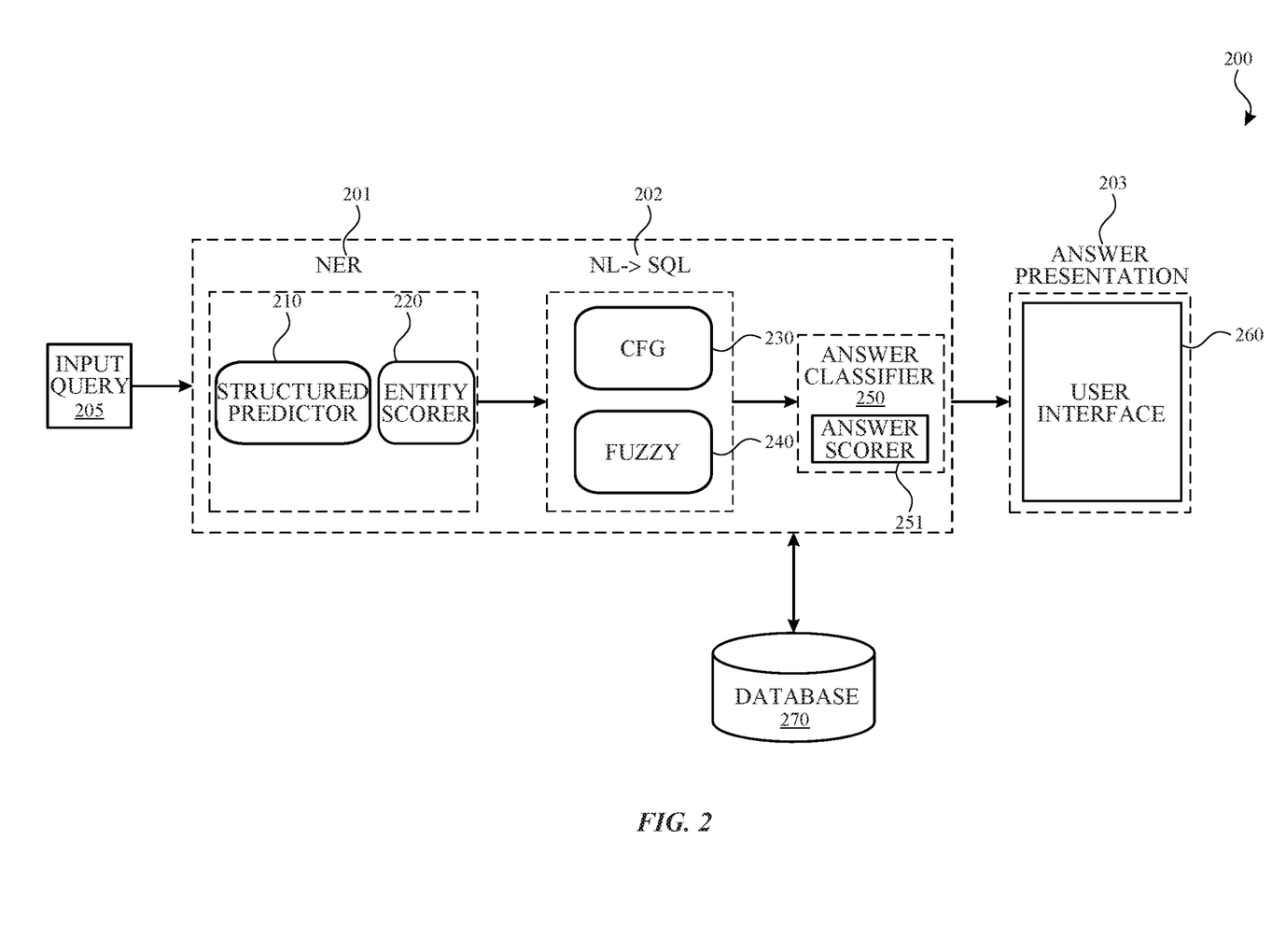
FIG. 2 illustrates an example software architecture for converting natural language input to structured queries in accordance with one or more implementations.

FIG. 2 illustrates an example software architecture 200 for converting natural language input to structured queries in accordance with one or more implementations. For explanatory purposes, the software architecture 200 is described as being provided by the server 120 of FIG. 1, such as by a processor and/or memory of the server 120; however, the software architecture 200 may be implemented by any other device such as the electronic device 110 and/or 115. In one or more implementations, a first portion of the software architecture 200 may be implemented by a first electronic device (e.g., the electronic device 110 or 115) and the remaining portion of the software architecture is then implemented by a server (e.g., the server 120). For example, a given electronic device (e.g., the electronic device 110 or 115) provides natural language input query to a server (e.g., the server 120) for processing, and the server may return answers to the natural language input to the given electronic device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated in FIG. 2, the software architecture 200 includes a named entity recognition (NER) component 201 that includes a structured predictor 210 and an entity scorer 220. The software architecture 200 further includes a natural language to structured query language component 202 that includes a context-free grammar (CFG) component 230 and a fuzzy matching component 240. In addition, the software architecture 200 includes an answer classifier 250 that includes an answer scorer component 251. As explained in more detail below, components of the software architecture may query and/or access data in a knowledge graph stored in a database 270 for converting natural language input to a structured query.

For the purposes of explanation the database 270 is illustrated as single component; however, it is appreciated that the database 270 may be implemented in various configurations. Without limitation, the database 270 may be provided in a single storage location or multiple storage locations. For example, the database 270 may be provided by a server, a network addressed storage location, a collection of computing devices, or as part of a cloud storage system presenting virtualized network storage.

The subject technology provides implementations for a natural language interface to databases (e.g., data that may be stored in the cloud in one or more servers) such as the database 270 in FIG. 2. In the example illustrated in FIG. 2, the software architecture includes components that convert the natural language input query to a query in a structured query format (e.g., a structured query language (SQL) format, or similar to an SQL format) and execute the query on the database 270. The database 270 may store information representing a knowledge graph which may indicate relationships and/or associations between entities and properties in a graph data structure in which nodes represent entities or values of properties, and edges between nodes indicate a relationship for a given property between given entities and/or values of properties. The database 270, in an implementation, stores information related to entities using a schema format for a given knowledge base, which may include items corresponding to a given entity, each item having a label, a description and any number of aliases. Items may be uniquely identified using an established identifier format. For the purpose of explanation a single knowledge graph is discussed in portions of the description herein; however, it is appreciated that the subject technology supports the utilization of different and/or multiple knowledge graphs, and may also utilize data in other formats (e.g., data in a relational database or data in a distributed database). Data in the database 270 may also be associated with different and/or multiple applications corresponding to respective domains (e.g., as discussed in more detail in FIG. 7 below).

As shown in FIG. 2, an input query 205 is received by the NER component 201. Examples of input queries are discussed further below. In one or more implementations, the NER component 201 receives a user input query (e.g., the input query 205), the query being in a natural language format of one or more words, and assigns respective probabilities for each word or combination of words indicating a likelihood of each word or combination of words corresponding to the entity of the input query. The input query 205, in an example, may be typed input or voice input.

In one or more implementations, the structured predictor 210 uses a long short-term memory (LSTM) which is machine learning model based on a recurrent neural network (RNN) architecture. In an example, the structured predictor 210 assigns respective initial scores (e.g., corresponding to probabilities) for one or more (or each) word from the input query 205. The entity scorer 220, using database signals from the database 270 in conjunction with the initial scores from the structured predictor 210, can determine respective scores for candidate entities. Each of the candidate entities may correspond to one or a combination of words from the input query 205. An example of scores being provided by the structured predictor 210 and/or the entity scorer 220 is discussed further below with respect to FIG. 4.

In one or more implementations, the entity scorer 220 limits (e.g., provides a cap) a number of candidate entities that are determined to a predetermined amount (e.g., top 10 likely entities based on the assigned probabilities). In one or more implementations, the entity scorer 220 determine scores for candidate entities using the database signals from the database 270 and selects an entity with a highest score. In an example, statistics from database signals may be utilized to determine a category of an entity (e.g., "midnight in Paris" corresponds to a movie). The entity scorer 220, in one or more implementations, is and/or includes a deep neural network.

Further, the software architecture 200 may support context dependency for natural language input queries by saving a state from query to query. For example, a state is saved from query to query so that the subject system can determine context from a subsequent query (e.g., a first input query for "Who is the president of the US?" and then receiving a second input query for "Where did he go to college?", and the software architecture 200 would save the state based on the first input query and contextually relate "he" to "the president" and/or the answer to the first query (e.g., "Donald SomeLastName").

Further, another example of contextual dependency can include the following: receiving a first input query for "What type of dog was Toto from the Wizard of Oz"→"Toto"; receiving a second input query for "What color was Toto?", and providing an answer to the color of "Toto" (e.g., the name of the dog). In this manner, context is carried by saving a set of named entities and adding "Toto" to one or more of those entities. Further, for supporting contextual dependency, one or more implementations can include an entity ID for each entity, which can be used later to determine an associated context.

In one or more implementations, the CFG component 230 utilizes CFG techniques for determining an attribute corresponding to the entity from the natural language input. The fuzzy matching component 240 maps paths/subgraphs to sentences. Given a user input query, the fuzzy matching component 240 finds the closest matching sentence. Using the results from the CFG component 230 and/or the fuzzy matching component 240, the entity and (optionally) remaining natural language input (e.g., the remaining words from the input query other than the entity) may be converted to a query in a structured query format. An example of context-free grammar is discussed further below with respect to FIG. 5, and an example of fuzzy matching is discussed further below with respect to FIG. 6.

The software architecture 200 further includes an answer classifier 250. The answer classifier 250 classifies a structured query to an answer type. Using the answer type, the software architecture 200 may further refine the query and/or target the query to a particular data set for querying. The software architecture 200 then queries the database 270 to determine answers (e.g., results) to the query based on the answer type and the structured query. The answer classifier 250 may also include an answer scorer, such as for scoring the answers. An example of an answer scorer is discussed further below with respect to FIG. 6.

Additionally, the software architecture 200 includes an answer presentation component 203 including a user interface component 260. The user interface component 260 presents the results to the query in a user interface. In another example, the user interface may include a component that renders (or provides instructions for rendering) the results to the query. In one or more implementations, the user interface component 260 may be implemented by one or more of the electronic devices 110 or 115.

Figure 3:
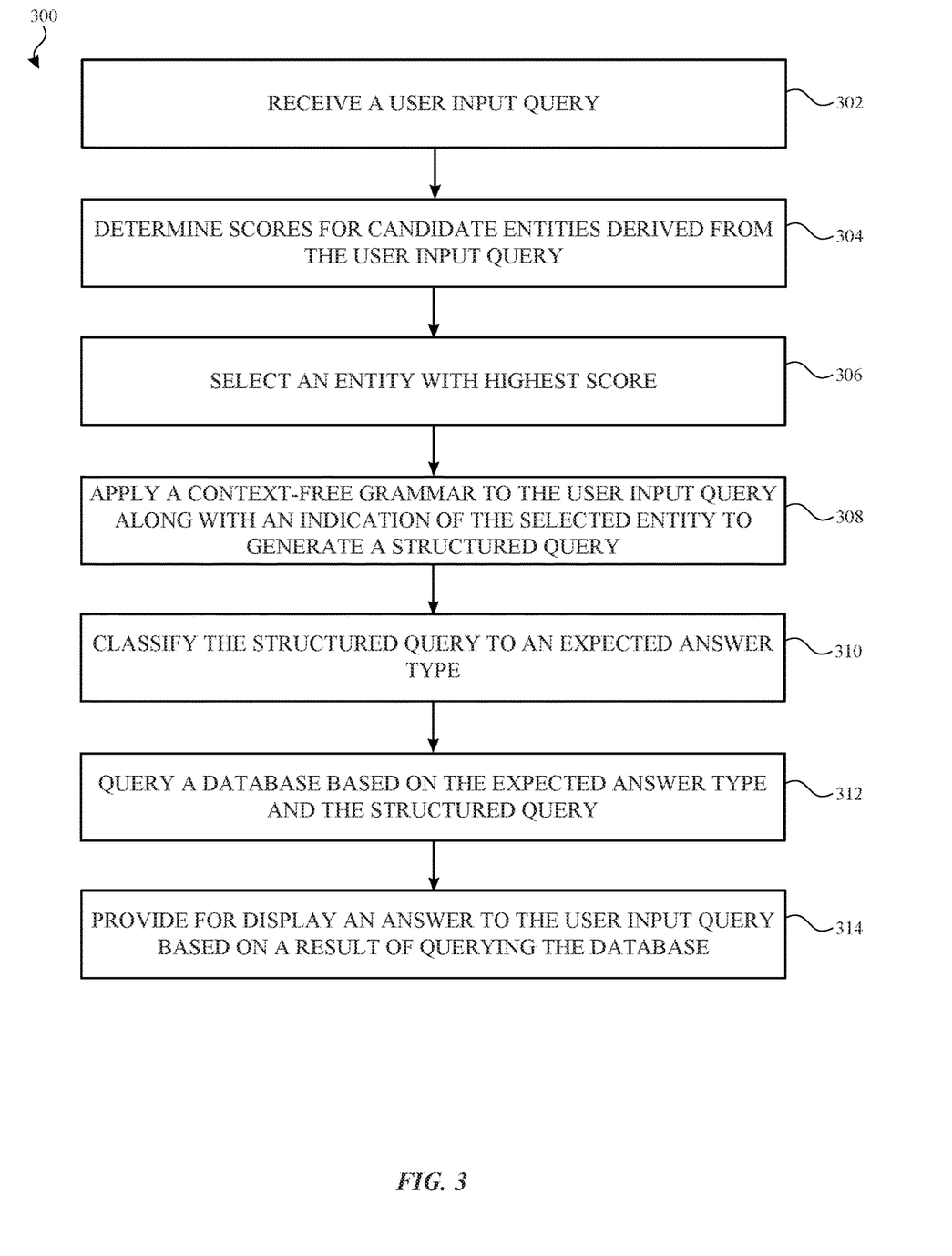
FIG. 3 illustrates an example process for providing answers to natural language input queries in accordance with one or more implementations.

FIG. 3 illustrates an example process for providing answers to natural language input queries in accordance with one or more implementations. For explanatory purposes, the process 300 is primarily described herein with reference to various components of the software architecture 200 of FIG. 2, which may be executed by one or more processors of the server 120, the electronic device 110, and/or the electronic device 115 of FIG. 1. However, the process 300 is not limited to the server 120, the electronic devices 110, 115, and/or the software architecture 200, and one or more blocks (or operations) of the process 300 may be performed by one or more other components of other suitable devices. Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

The process 300 is initiated when a query is received, such as when a user provides a query in a natural language format to one or more of the electronic devices 110, 115. The NER component 201 receives the user input query, the user input query being in the natural language format and having one or more words (302). For example, a user may provide a query via the electronic device 110, and the electronic device 110 may transmit the query to the server 120 which may implement the NER component 201. In one or more implementations, the NER component 201 may be implemented locally on the electronic device 110.

The NER component 201 determines scores for candidate entities derived from the user input query, the scores being based at least in part on historical statistical information corresponding to the candidate entities (304). In one or more implementations, each candidate entity potentially corresponds to a subject or noun of the user input query. For example, the NER component 201 determines scores for candidate entities using database signals that indicate a popularity of each of the candidate entities based on statistical information retrieved from a database and/or historical information corresponding to prior user input queries received by the NER component 201. An example of determining scores for the candidate entities is discussed further below with respect to FIG. 4.

The NER component 201 selects an entity with highest score among the candidate entities (306). The natural language to structured query language component 202 applies a context-free grammar and/or fuzzy matching to the user input query along with an indication of the selected entity to generate a structured query (308). For example, the NER component 201 may apply the context-free grammar to the user input query along with an indication of the selected entity to generate the structured query. In one or more implementations, the structured query may be a query directed to the selected entity. An example of a context-free grammar is discussed further below with respect to FIG. 5, and an example of fuzzy matching is discussed further below with respect to FIG. 6.

The answer classifier 250 classifies the structured query to an expected answer type, the expected answer type corresponding to a type of an expected answer of the structured query (310). The classification of structured queries to answer types is discussed further below with respect to FIG. 7. The software architecture 200 queries the database 270 based on the expected answer type and the structured query (312). The answer presentation component 203 provides for display an answer to the user input query based on a result of querying the database 270 (314). For example, the server 120 may provide the answer to the electronic device 110 which may implement the answer presentation component 203.

As an illustration, a first node in a given knowledge graph stored in the database 270 can correspond to a city (e.g., "New York City") which is connected to a second node corresponding to a population value (e.g., "8.5 million") of that city. In this example, an edge connecting the first node to the second node represents a property corresponding to "population" of the first node. Further, the first node can be connected to a third node corresponding to a value indicating a mayor of the city (e.g., "Bill MayorNYCLastName"). A second edge connecting the first node to the third node therefore represents a property corresponding to "mayor" of the first node. It is appreciated that other examples of nodes corresponding to respective entities or values of properties are contemplated by the subject technology, and the previous examples are provided for purposes of explanation.

In one or more implementations, techniques described herein provide, in part, a context-free grammar (e.g., providing syntactic parsing) based method that works with additional semantic information that can be derived based on the input query, without requiring the usage of substantial amounts of training data to disambiguate potential or candidate entities within the natural language input. The additional semantic information can be based on statistically-based information that indicates a likelihood of whether a candidate entity is associated with the input query.

Some non-limiting examples of natural language input related to knowledge type questions include, for example, the following questions: 1) single-entity & single-attribute questions (e.g., "who is a famous person dating?", "where is a famous person from?", "how old is a famous person?"); 2) composite questions (e.g., "how old are the President1's daughters?"); 3) fuzzy match (e.g., "when did this come out?" vs. "when is this song from?" vs. "when was this song released?"); 4) list questions with filtering (e.g., "which actors were born in Cupertino"); 5) comparative and superlative (e.g., "is President1 taller than President2?" or "which is famous director's oldest movie?"); 6) questions containing multiple entities as inputs (e.g., "who was the US President before President1?" or "which US President was educated at Harvard?"); 7) questions about a point in time (e.g., "who was the US President during WW1?" or "who was CEO of Company123 when ProductXYZ was released"); 8) questions about the current context (e.g., "who is President1's wife" followed up by "how old is she?"); 9) questions about one-time and recurring events (e.g., "when is the next solar eclipse?", "when are the famous music awards show?").

Some non-limiting examples of natural language input related to music type questions include, for example, the following types of questions which have been generalized; however, it will be understood that in at least one implementation, for example, a "famous singer" would actually be the name of a famous singer: 1) questions related to artist facts (e.g., "how old was a famous singer when she joined a famous band?", "how many music awards does a famous singer have?", "who sang a famous song?", "who is a famous person's wife?", "when did a famous singer pass away?", "where was a famous singer born?"; 2) questions related to instruments (e.g., "who plays the drums in the a famous band?", "who is the lead singer of a famous band?"); 3) questions related to songs (e.g., "when was a famous song released?", "what is a famous singer's most recent song?", "what was the most popular song in 2016?").

Figure 4:
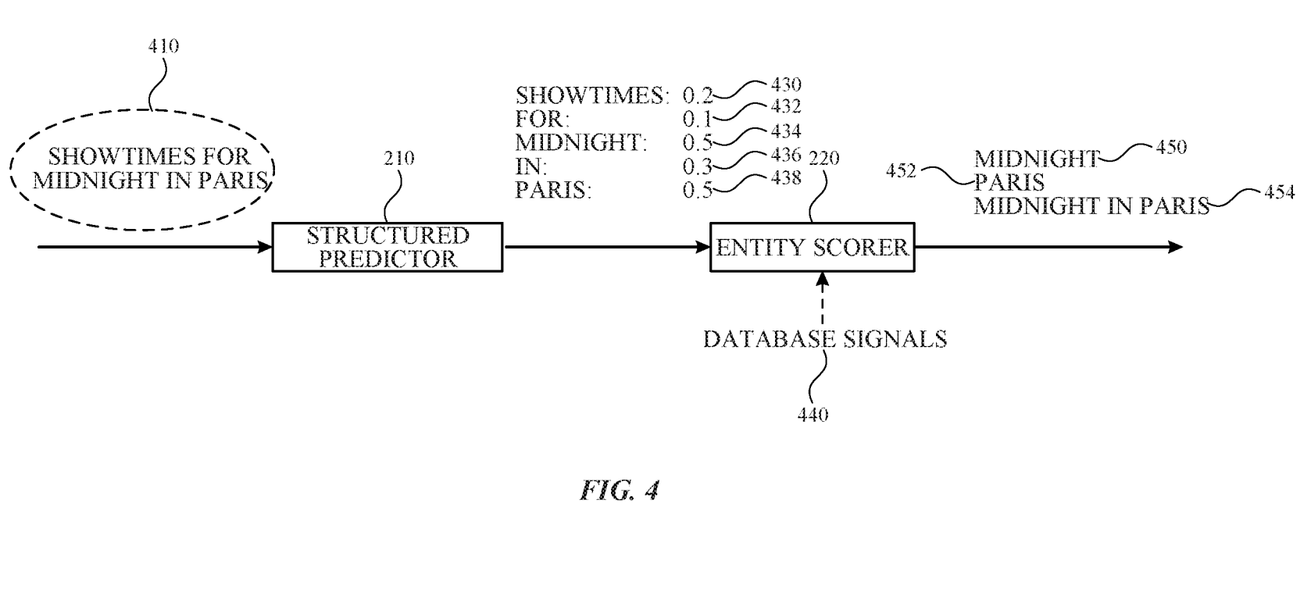
FIG. 4 illustrates an example of providing scores for entities in accordance with one or more implementations.

FIG. 4 illustrates an example of providing scores for entities in accordance with one or more implementations. FIG. 4 will be described by reference to components of the software architecture 200 in FIG. 2.

An (natural language) input query 410 ("Showtimes for midnight in Paris") is received by the structured predictor 210 of the NER component 201. As shown, the structured predictor 210 separates words from the input query 410 and determines associated probabilities 430, 432, 434, 436, and 438 for each word from the input query 410. The probabilities 430, 432, 434, 436, and 438 may indicate a respective likelihood that a particular word corresponds to a candidate entity of the input query 410. As further shown, the highest probabilities correspond to the probabilities 434, 436, and 438 for the words "midnight," "in", and "Paris," respectively. In an example, the structured predicator 210 may utilize statistical parsing techniques to determine the probabilities 430, 432, 434, 436, and 438 corresponding to a respective noun or object of the input query 410.

The entity scorer 220 receives the associated probabilities 430, 432, 434, 436, and 438, and a set of database signals 440 from the database 270. The entity scorer 220 may initially select the words of the input query 410 corresponding to a number of the words from the input query 410 with the highest probabilities as an initial set of candidate entities (e.g., the words "midnight," "in", and "Paris,"). Using the database signals 440, the entity scorer 220 can further determine or adjust probabilities for candidate entities based on, for example, statistical information indicating popular queries that include one or more words (e.g., combinations of words) from the input query 410 (e.g., the words "midnight," "in", and "Paris,"). More specifically, popular queries may be based on historical information that indicates respective numbers of particular prior queries that have been received by the NER component 201.

In one or more implementations, the database signals 440 may further include information corresponding to the categories of the prior queries. For example, the statistics from the database signals 440 can be used to determine that queries for an entity corresponding to a particular combination of words of "midnight in Paris" have a higher degree of popularity and determine that a category of this entity corresponds to a movie. Further, the database signals 440 can include statistics and information that are obtained over time based on previous user queries that are submitted (e.g., historical information). For example, a statistic corresponding to a frequency of queries about a given person's height, or a frequency of queries about a given person's spouse may be utilized determining a category for the candidate entities and for ranking the candidate entities (e.g., more frequent queries in a particular category may be ranked higher). Such statistics therefore can determine that a given input query is directed to a particular category over another category (e.g., animals instead of movies, people instead of cities, etc.).

In the aforementioned example of an entity corresponding to "midnight in Paris", the entity scorer therefore can utilize the database signals 440 to determine that this particular entity is more likely to correspond to a movie instead of a city, a time of day, and/or another category. As discussed before, the database signals 440 based on prior queries can indicate that an entity corresponding to "midnight in Paris" has a higher (or highest) degree of popularity when associated with a movie category and in view of also being included with the word "Showtimes" from the input query 410. Based on the database signals 440 and/or initial associated probabilities, the entity scorer 220 can then assign respective scores to the candidate entities. In one example, a respective score for a particular candidate entity is based on a function of an associated probability of the candidate entity (previously discussed above) and the information derived from the database signals 440. The entity scorer 220 then selects a set of candidate entities that have the highest scores (e.g., limited to a number such as the top three scores), which as shown, correspond to entities 450, 452, and 454.

Figure 5:
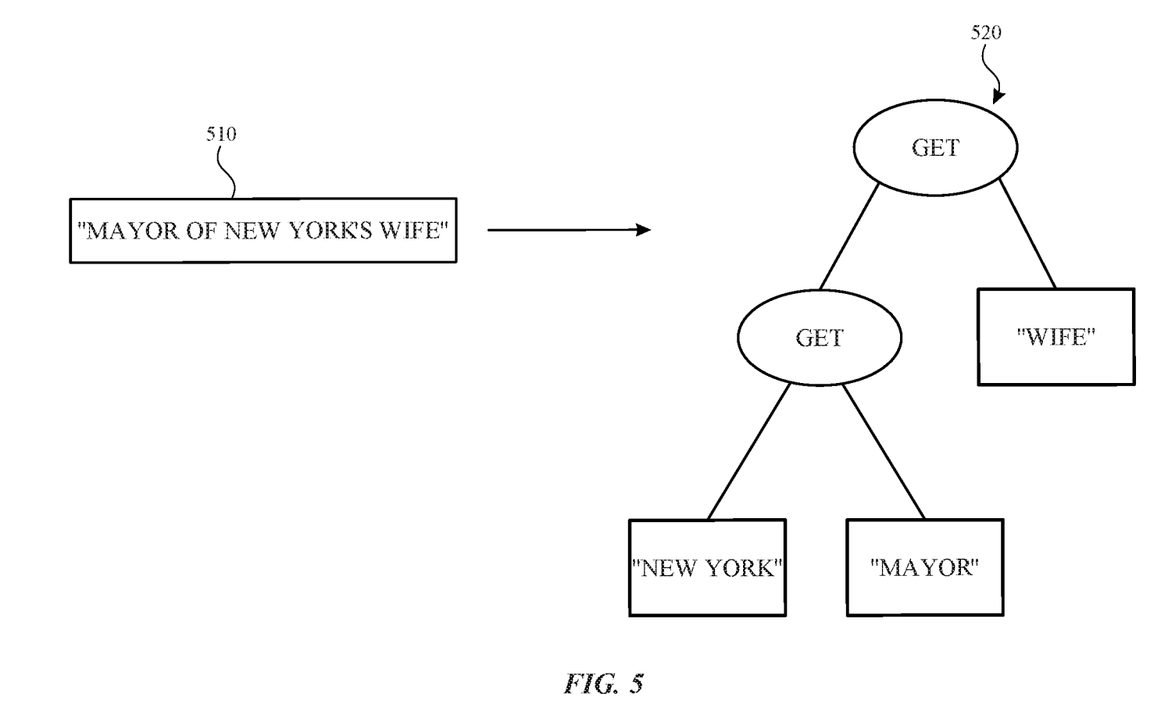
FIG. 5 illustrates an example context-free grammar in accordance with one or more implementations.

FIG. 5 illustrates an example context-free grammar in accordance with one or more implementations. FIG. 5 will be described by reference to components of the software architecture 200 in FIG. 2.

To convert a given natural language input so a structured query format, the CFG component 230 utilizes context-free grammar techniques for determining an attribute corresponding to an entity from the natural language input, which can correspond to a given candidate entity that is determined from the entity scorer 220 as discussed above. In an example, a context-free grammar is a set of recursive rewriting rules (or productions) used to generate patterns of strings.

In the example of FIG. 5, an input query 510 corresponding to "mayor of New York's wife" is received by the entity scorer 220 that determines that "New York" is an entity of the input query 510, such as the entity of the input query 510 with the highest score. The CFG component 230, in this example, provides a context-free grammar that includes two rules, which are applied to the entity (e.g., "New York") and the rest of the input query:

$entity→$entity's $attribute→(e.g., "New York's mayor")
$entity→$attribute of $entity→(e.g., "mayor of New York")

As shown above, the result of applying the two rules would result in structured queries corresponding to "New York's mayor" and "mayor of New York". Thus, the CFG component 230 provides a database query (e.g., the structured queries) as output. The CFG component 230 can further utilize semantic information based on database signals to determine that a place (e.g., city) can have a mayor, but a person does not have a mayor, and a person could have a wife, but a place does not have a wife, etc. High-level statistics may be extracted from information from a given database (e.g. cities have mayors but people do not, people have spouses but cities do not, etc.) that can provide high-level information in an example.

In one or more implementations, the CFG component 230 may utilize database signals (e.g., the database signals 440 from the database 270) to rank and/or prune one or more structured queries. Initially, the database signals 440 may utilize high-level information corresponding to different properties such as, for example, how many people in the database 270 have spouses, the respective dates for different music albums, respective heights for different people, respective lengths of different bridges, etc. Such high-level information can represent domain knowledge that is utilized to determine that a particular entity may not have a certain property (e.g., a person may have a spouse, but a city does not have a spouse). Further, the high-level information can be utilized compositionally in order to determine, for example, how old are a particular person's child since it can be determined that a person's child is a person, and such a person would also have an age.

As information about input queries are collected over time, the CFG component 230 can rank and prune particular structured queries based on, for example, high-level information a frequency of queries for a particular property of a given entity (e.g., how often are input queries asking about a person's height, how often are input queries asking about a person's spouse, etc.). In another example, when there are two selected entities that may have a similar property (e.g., a first entity of "mayor of New York" and a property of wife, or a second entity of "New York" and the property of wife), the domain knowledge, determined from the high-level information, can be utilized to determine that a structured query for a wife of a city (e.g., "wife of New York") would not make sense and such a structured query could pruned (e.g., removed or filtered from a set of structured queries) before the ranking of the structured queries determined by the CFG component 230. In this example, in response to discarding the particular query for "wife of New York", the CFG component 230 would select the other structured query corresponding to "wife of New York's mayor" instead for querying the database 270. Advantageously, improvements in processing times are possible based at least on a reduction in a number of structured queries that are provided as output from the CFG component 230.

Further, word/language statistics, which may be unigram probabilities (e.g., corresponding to individual words), may be utilized by the CFG component 230. Additionally, the CFG component 230 may utilize synonyms of terms in the input query 510 in an implementation. For example, a dictionary containing synonyms of words of the input query 510 can be used to determine that words are synonymous (e.g., a "born" word in an input query is similar to and therefore corresponds to a "birth place" property).

Due to the flexibility of the CFG component 230, implementations of the CFG component 230 apply techniques that allow for extra tokens (e.g., words) to be included in a given input query and not result in failure in parsing of the input query because of the extra tokens. The CFG component 230 can utilize a technique based on a Levenshtein distance (LD) that is a measure of the similarity between two strings based on a number of characters that would have to be inserted or deleted to make the two strings identical. In an example, the CFG component 230 can determine whether one or more tokens (e.g., words instead of characters) in a given input query (e.g., an entire sentence or sentences) could be removed and still match at least one of the rules provided by the context-free grammar. Such an input query, although including one or more extra tokens, would then be allowed to be converted to a particular structured query by the CFG component 230.

In the example of FIG. 5, the CFG component 230 would provide a query in a structured format 520 (e.g., a structured query) that is based on a first sub-query corresponding to "New York" and "mayor" and a second sub-query that is based the result of the first sub-query and "wife". In another example, a structured query could have a structured format as "New York" and "Mayor" and "wife".

Figure 6:
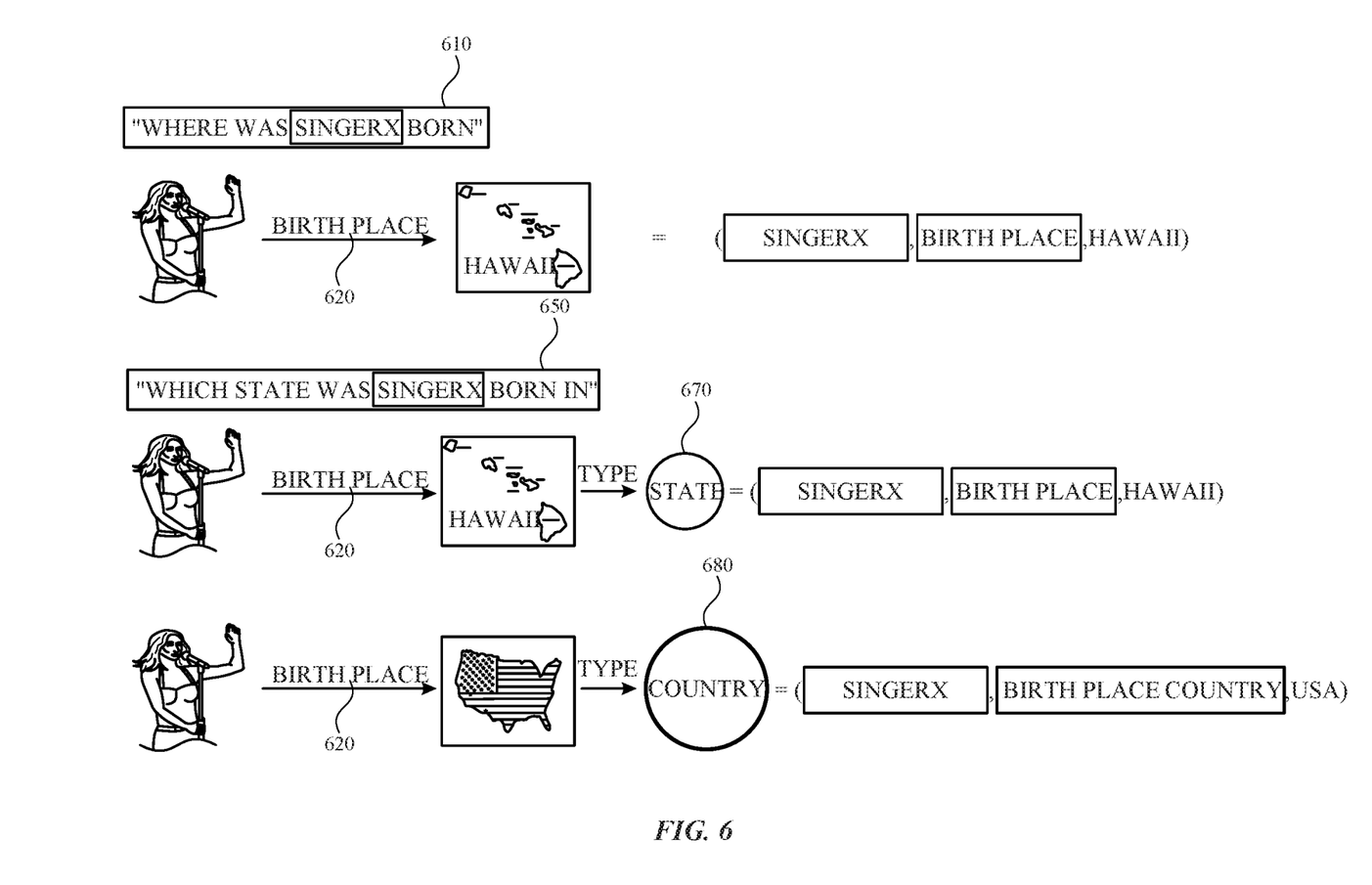
FIG. 6 illustrates an example of utilizing fuzzy matching techniques in determining a structured query in accordance with one or more implementations.

FIG. 6 illustrates an example of utilizing fuzzy matching techniques in determining a structured query in accordance with one or more implementations. FIG. 6 will be described by reference to components of the software architecture 200 in FIG. 2.

In an example of FIG. 6, an input query 610 corresponding to "Where was SingerX born" is received by the entity scorer 220 that determines that an entity corresponding to "SingerX" is an entity from the input query 610. The fuzzy matching component 240 maps the rest of the input query 610 (e.g., "where was born") to data in a knowledge graph. In this example, the fuzzy matching component 240 determines a mapping to a property 620 corresponding to "birth place" from a node corresponding to the entity "SingerX" in the knowledge graph, which results in a structured query corresponding to "SingerX" and "birth place". The property 620, in an example, may correspond to an edge representing a "birth place" property that connects the node corresponding to the entity "SingerX" to a second node in the knowledge graph. This second node corresponds to a particular value for the "birth place" property associated with the edge connected to the first and second nodes.

In another example of FIG. 6, an input query 650 corresponding to "Which state was SingerX born in" is received by the entity scorer 220 that determines that an entity corresponding to "SingerX" is an entity from the input query 650. The fuzzy matching component 240 maps the rest of the input query 650 (e.g., "which state born in") to data in a knowledge graph. In this example, the fuzzy matching component 240 determines a mapping to the property 620 corresponding to "birth place" and by further utilizing a type property (which may be another edge from a node corresponding to a "birth place" node), the fuzzy matching component 240 can distinguish between different structured queries. In this example, the fuzzy matching component 240 would likely not generate a structured query including a type property 680 corresponding "country" and instead generate a structured query including a type property 670 corresponding to "state".

In an example, a convolutional neural network can be used by the fuzzy matching component 240 to forgo the use of a listing of synonyms or a dictionary (e.g., as utilized by the CFG component 230) to match words from the input query to nodes in the knowledge graph. A first n dimensional vector (e.g., a 300-dimensional vector) can be used for the input query, and a second n dimensional vector can be utilized for edges and nodes from the knowledge graph as inputs to the convolutional neural network. Based on these input vectors, the convolutional neural network, utilizing word embeddings, can determine similar words for the words from the input query based on a measure of semantic closeness to the words of the input query.

In an example, the convolutional neural network determines respective vector representations of the words from a given input query and the edges from the knowledge graph. Respective words may have semantic relationships with each other including, for example, a relationship of being semantically similar and/or a relationship of being semantically related. Similar words may have similar vector representations, and their distances to one another may be compared in order to determine which words are semantically similar. In at least an implementation, the measure of semantic closeness refers to a metric corresponding to semantic similarity. Semantically similar words or similar words, as used herein, can be determined based on a metric corresponding to a distance between a given first word and a given second word in which the distance indicates a likeness of the meaning or semantic content of the respective words, e.g., as opposed to the syntactical representation (e.g., string format) of respective words. Additionally, semantically related words can be determined based on a particular relation between respective words. For example, the word "boat" may be semantically similar to the word "ferry", and the word "boat" may be semantically related to the word "ocean," but the word "boat" may not be semantically similar to the word "ocean."

In an example, an input query corresponding to "where was FormerPresidentX born" is received by the NER component 201. The NER component 201 can determine that "FormerPresidentX" is the most likely candidate entity from the input query. The fuzzy matching component 240 can then locate a node within the knowledge graph corresponding to "FormerPresidentX" which is connected to a different node via an edge representing a property corresponding to "birth place". Using the convolutional neural network, the fuzzy matching component 240 determines semantically similar words corresponding to the edges that represent respective properties from the node for "FormerPresidentX", and determines whether one or more of these semantically similar words correspond to words from the input query. In an example, the fuzzy matching component 240 determines an edge representing the property corresponding to "birth place", connected to the node for "FormerPresidentX", is semantically similar to the word "born" from the input query. The fuzzy matching component 240 therefore may provide as output a structured query that maps the word "born" to the edge corresponding to the property "birth place" in the knowledge graph. In this manner, the fuzzy matching component 240 can apply word embedding techniques for determining semantically similar words for edges in the knowledge graph based on candidate entities from any given input query.

Figure 7:
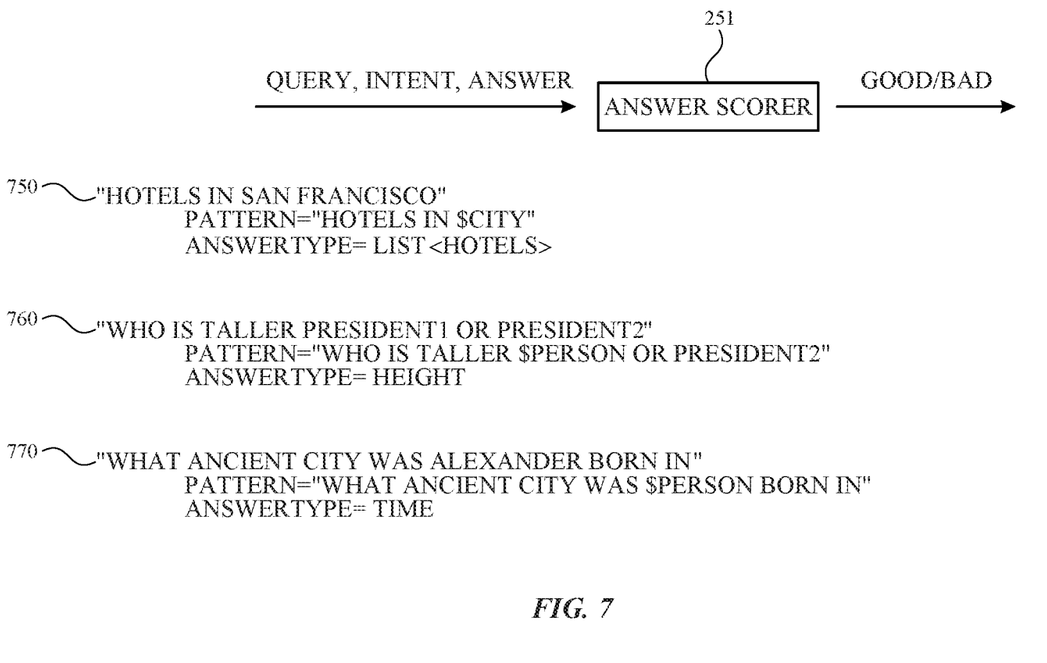
FIG. 7 illustrates an example of answer scoring techniques in accordance with one or more implementations.

FIG. 7 illustrates an example of answer scoring techniques in accordance with one or more implementations. FIG. 7 will be described by reference to components of the software architecture 200 in FIG. 2.

In one or more implementations, the answer classifier 250 identifies a pattern associated with the structured query, and determines a type for an expected answer corresponding to the structured query (e.g., answer type). For example, an example query 750 corresponding to "hotels in San Francisco" matches a pattern="hotels in $city" that can correspond to an answerType=list<hotels> that provides for a list of hotels for that city. Based on the type for the answer, the answer scorer component 251 of the answer classifier 250 can make a determination whether a given domain is a good or bad domain for querying and/or presenting an answer to the structured query. In the context of the discussion of the answer classifier 250, a domain can refer a particular database, application, or display format for querying and/or presenting an answer to the structured query. For example, the answer scorer component 251 can use domain specific logic: e.g., ask for "hotels in San Francisco" and instead of returning a list of hotels, determine that providing a map with hotels is appropriate. In this example, the answer scorer component 251 determines a higher score for providing an answer to the structured query in a map with hotels, and determines a lower score for providing the answer as a list of hotels. Based on such respective scores, the answer classifier 250 selects the higher score corresponding to a particular domain for querying and/or providing an answer to the structured query. For example, based on the selected score corresponding to the particular domain (e.g., the map domain), the answer classifier 250 can indicate that querying a maps database associated with a maps application is more appropriate instead of querying, for example, another knowledge graph, and that the answer to the structured query should be presented in the maps application. In another example, instead of indicating a different database to query, the answer classifier 250 may indicate a particular portion of a knowledge graph for querying.

In one or more implementations, the answer classifier 250 can determine an appropriate domain for providing the answer to the structured query based on historical information with respect to a given's user preference for previous answers. For example, a user can provide previous feedback indicating that the user prefers an answer to a particular type of structured query in a particular domain (e.g., on a map instead of text form in a listing for queries related to hotels). Such information can be utilized by the answer classifier 250 to determine a likely domain preference for presenting an answer to a subsequent structured query.

The answer classifier 250, in an example, can determine errors in entity recognition by the NER component 201. Thus, it is appreciated that the answer classifier 250 can act as a last level of defense in the subject system in determining whether a given structured query should be run against a given database. In this manner, a given structured query may be rejected as a bad structured query by the answer classifier 250 and not be processed further.

In one example, an example query 760 corresponding to "who is taller President) or President2" matches a pattern="who is taller $person or President2" that can correspond to an answerType=height that provides an answer type related to height. In an example where the answer classifier 250 receives a given structured query where a recognized entity does not correspond to a person, the answer classifier 250 can reject that structured query.

In another example, an example query 770 corresponding to "what ancient city was Alexander born in" matches a pattern="what ancient city was $person born in" that can correspond to an answerType=time that provides an answer type related to time. In an example, where the answer classifier 250 receives a given structured query where a given entity does not correspond to a person, the answer classifier 250 can reject that structured query.

It is appreciated that other patterns may be utilized by the answer classifier 250 to match different structured queries than the examples described above.

Additionally, the answer scorer component 251 may score answers to the structured query in a case where more than one answer is provided as a result of querying the database 270. The scored answers may be ranked by the answer scorer component 251 using any appropriate ranking technique for providing as output to the answer presentation component 203.

Figure 8:
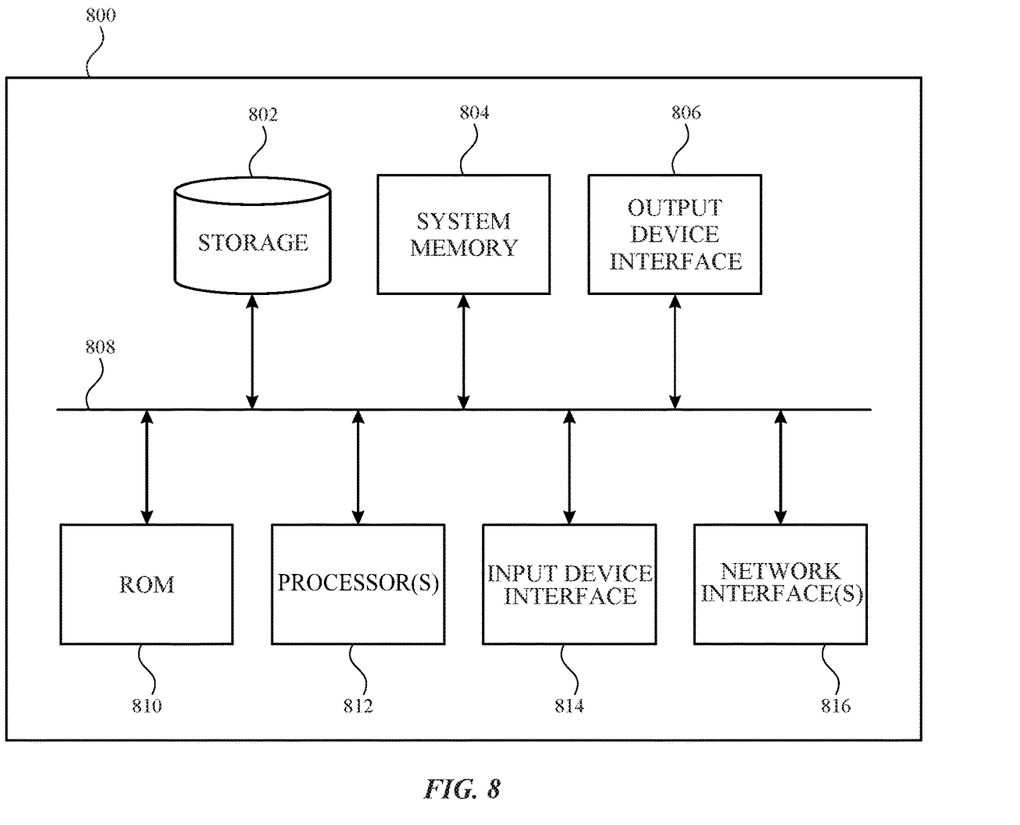
FIG. 8 illustrates an electronic system with which one or more implementations of the subject technology may be implemented.

FIG. 8 illustrates an electronic system 800 with which one or more implementations of the subject technology may be implemented. The electronic system 800 can be, and/or can be a part of, the electronic device 110, the electronic device 115 and/or the server 120 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the electronic device 110 and/or 115 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   receiving a user input query, the user input query being in a natural language format;
   determining scores for candidate entities derived from the user input query, the scores being based at least in part on historical statistical information corresponding to the candidate entities;
   selecting an entity with a highest score among the candidate entities;
   applying a context-free grammar to the user input query along with an indication of the selected entity to generate a structured query;
   classifying the structured query to an expected answer type, the expected answer type corresponding to a type of an expected answer of the structured query;
   querying a database based on the expected answer type and the structured query; and
   providing, for display, an answer to the user input query based on a result of querying the database.

2. The method of claim 1, wherein determining scores for candidate entities further comprises:
   assigning respective probabilities for each word or combination of words from the user input query, the respective probabilities indicating a likelihood of each word or combination of words corresponding to a particular candidate entity.

3. The method of claim 1, wherein the database comprises information corresponding to a knowledge graph and applying the context-free grammar to the user input query is further based on fuzzy matching of information from the knowledge graph to determine at least a portion of the structured query.

4. The method of claim 3, wherein fuzzy matching of data of information from the knowledge graph further comprises:
   determining a particular node in the knowledge graph corresponding to the selected entity;
   selecting an edge connecting the particular node to a second node, the edge representing a particular property associated with the selected entity;
   determining words that have a semantic relationship with respect to the particular property;
   determining that a particular word from the user input query is similar to a respective word from the determined semantic relationship words for the particular property; and
   providing a mapping of the particular word to the particular property of the edge.

5. The method of claim 1, wherein applying the context-free grammar to the user input query along with the indication of the selected entity to generate the structured query further comprises:
   removing a particular word from the user input query, the particular word corresponding to an extra token in the user input query; and
   determining whether remaining words from the user input query match a particular rule provided by the context-free grammar.

6. The method of claim 1, further comprising:
   selecting a second entity among the candidate entities;
   applying the context-free grammar to the user input query along with an indication of the selected second entity to generate a second structured query;
   discarding, based on domain knowledge, the second structured query for querying the database based on the selected second entity; and
   in response to the discarding, selecting the structured query for querying the database.

7. The method of claim 6, wherein the domain knowledge is based at least in part on statistics indicating a frequency of particular input queries for particular properties of respective entities.

8. The method of claim 1, wherein providing, for display, the answer to the user input query is based on a domain of the expected answer of the structured query.

9. The method of claim 1, wherein the expected answer type corresponds to at least one of a category, topic, or format for a query response to the structured query.

10. A device comprising;
    at least one memory; and
    at least one processor configured to:
       receive a user input query, the user input query being in a natural language format;
       convert, using a context-free grammar, the user input query to a structured query based at least in part on an entity selected from the user input query;
       classify the structured query to an expected answer type, the expected answer type corresponding to a type of an expected answer of the structured query;
       query a database based on the expected answer type and the structured query; and
       provide, for display, an answer to the user input query based on a result of querying the database.

11. The device of claim 10, wherein the at least one processor is further configured to:
    assign respective probabilities for each word or combination of words from the user input query, the respective probabilities indicating a likelihood of each word or combination of words corresponding to a particular candidate entity.

12. The device of claim 10, wherein the database comprises information corresponding to a knowledge graph and the at least one processor is configured to convert, using the context-free grammar, the user input query based on fuzzy matching of information from the knowledge graph to determine at least a portion of the structured query.

13. The device of claim 12, wherein the at least one processor is further configured to:
    determine a particular node in the knowledge graph corresponding to the selected entity;
    select an edge connecting the particular node to a second node, the edge representing a particular property associated with the selected entity;

determine words that have a semantic relationship with respect to the particular property;

determine that a particular word from the user input query is similar to a respective word from the determined semantic relationship words for the particular property; and provide a mapping of the particular word to the particular property of the edge.

14. The device of claim 10, wherein the at least one processor is further configured to:

remove a particular word from the user input query, the particular word corresponding to an extra token in the user input query; and determine whether remaining words from the user input query match a particular rule provided by the context-free grammar.

15. The device of claim 10, wherein the at least one processor is further configured to:

select a second entity from the user input query;

apply the context-free grammar to the user input query along with an indication of the selected second entity to generate a second structured query;

discard, based on domain knowledge, the second structured query for querying the database based on the selected second entity; and in response to the discarding, select the structured query for querying the database.

16. The device of claim 15, wherein the domain knowledge is based at least in part on statistics indicating a frequency of particular input queries for particular properties of respective entities.

17. The device of claim 10, wherein the at least one processor is further configured to provide, for display, the answer to the user input query is based on a domain of the expected answer of the structured query.

18. The device of claim 10, wherein the expected answer type corresponds to at least one of a category, topic, or format for a query response to the structured query.

19. A computer program product comprising code stored in a non-transitory computer-readable storage medium, the code comprising:

code to receive a user input query;

code to determine scores for candidate entities derived from the user input query, the scores being based at least in part on historical statistical information corresponding to the candidate entities;

code to select an entity with a highest score among the candidate entities;

code to convert, using a context-free grammar, the user input query to a structured query based at least in part on the selected entity;

code to query a database based on the structured query, the database including information corresponding to associations between entities; and code to provide, for display, an answer to the user input query based on a result of querying the database.

20. The computer program product of claim 19, wherein the code to determine scores for candidate entities further comprises:

code to assign respective probabilities for each word or combination of words from the user input query, the respective probabilities indicating a likelihood of each word or combination of words corresponding to a particular candidate entity.

21. The computer program product of claim 19, wherein the information corresponding to associations between entities comprises a knowledge graph and the code to convert, using the context-free grammar, the user input query to the structured query comprises to code to convert, using the context-free grammar, the user input query to the structured query based at least in part on fuzzy matching of information from the knowledge graph to determine at least a portion of the structured query.

22. The computer program product of claim 19, wherein the code to convert, using the context-free grammar, the user input query to the structured query comprises code to convert, using the context-free grammar, the user input query to the structured query based at least in part on fuzzy matching of the information corresponding to the associations between the entities to determine at least a portion of the structured query.

* * * * *